(12) United States Patent
Wang et al.

(10) Patent No.: US 9,201,753 B2
(45) Date of Patent: Dec. 1, 2015

(54) INTEGRATED CIRCUIT AND METHOD FOR MONITORING BUS STATUS IN INTEGRATED CIRCUIT

(71) Applicant: Huawei Technologies Co., Ltd., Shenzhen, Guangdong (CN)

(72) Inventors: Haijun Wang, Beijing (CN); Xingguo Sun, Shenzhen (CN); Wei Tang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 13/754,454

(22) Filed: Jan. 30, 2013

(65) Prior Publication Data
US 2013/0246859 A1 Sep. 19, 2013

(30) Foreign Application Priority Data
Mar. 1, 2012 (CN) .......................... 2012 1 0051640

(51) Int. Cl.
*G06F 11/00* (2006.01)
*G06F 11/34* (2006.01)
*G06F 11/30* (2006.01)

(52) U.S. Cl.
CPC ........ *G06F 11/3409* (2013.01); *G06F 11/3027* (2013.01); *G06F 11/3055* (2013.01)

(58) Field of Classification Search
CPC ............ G06F 11/3409; G06F 11/3027; G06F 11/3055
USPC .......................................................... 714/43
See application file for complete search history.

(56) References Cited

U.S. PATENT DOCUMENTS

| 4,516,205 | A | * | 5/1985 | Eing A. ................. H04L 12/417 |
| | | | | 370/462 |
| 5,083,258 | A | * | 1/1992 | Yamasaki ...................... 710/114 |
| 5,123,017 | A | * | 6/1992 | Simpkins et al. ............... 714/26 |
| 5,270,699 | A | * | 12/1993 | Signaigo et al. ......... 379/265.02 |
| 5,440,772 | A | * | 8/1995 | Springer et al. ............... 14/69.5 |
| 5,544,311 | A | * | 8/1996 | Harenberg et al. ............ 714/40 |
| 5,758,065 | A | * | 5/1998 | Reams et al. .................... 714/48 |
| 5,771,356 | A | * | 6/1998 | Leger .................... G06F 13/387 |
| | | | | 709/231 |
| 5,838,899 | A | * | 11/1998 | Leavitt et al. ................... 714/56 |
| 5,991,900 | A | * | 11/1999 | Garnett .......................... 714/56 |
| 5,996,035 | A | * | 11/1999 | Allen et al. .................... 710/302 |
| 6,000,043 | A | * | 12/1999 | Abramson ..................... 714/44 |
| 6,032,271 | A | * | 2/2000 | Goodrum et al. .............. 714/56 |
| 6,049,894 | A | * | 4/2000 | Gates ............................. 714/41 |

(Continued)

FOREIGN PATENT DOCUMENTS

CN 101398467 A 4/2009
JP 2002311104 A 10/2002

OTHER PUBLICATIONS

Shirato Takaharu, "Apparatus and Method for Processing Information & Program" Dec. 9, 2004 Japanese Patent Office.*

*Primary Examiner* — Amine Riad

(57) ABSTRACT

Embodiments of the present invention disclose an integrated circuit and a method for monitoring a bus status in the integrated circuit. Multiple status detectors and a top layer monitor are disposed in the integrated circuit. Each status detector in the multiple status detectors is used to read status data on a branch bus that is coupled to each status detector in the multiple status detectors, and then the top layer monitor collects the status data from each status detector, and outputs the status data through an interface.

14 Claims, 6 Drawing Sheets

(56) References Cited

U.S. PATENT DOCUMENTS

| | | | | |
|---|---|---|---|---|
| 6,058,450 | A * | 5/2000 | LaBerge | G06F 13/4217 710/107 |
| 6,069,493 | A * | 5/2000 | Pigott et al. | 326/83 |
| 6,073,200 | A * | 6/2000 | Knudsen et al. | 710/305 |
| 6,138,198 | A * | 10/2000 | Garnett et al. | 710/311 |
| 6,141,769 | A * | 10/2000 | Petivan et al. | 714/10 |
| 6,170,022 | B1 * | 1/2001 | Linville | H04L 47/10 370/227 |
| 6,195,768 | B1 * | 2/2001 | Green | 714/47.3 |
| 6,253,334 | B1 * | 6/2001 | Amdahl et al. | 714/4.12 |
| 6,292,201 | B1 * | 9/2001 | Chen et al. | 345/519 |
| 6,292,717 | B1 * | 9/2001 | Alexander et al. | 700/293 |
| 6,292,910 | B1 * | 9/2001 | Cummins | G06F 13/423 714/43 |
| 6,445,959 | B1 * | 9/2002 | Poth | 700/28 |
| 6,453,429 | B1 * | 9/2002 | Sadana | 714/43 |
| 6,460,107 | B1 * | 10/2002 | Rao et al. | 710/305 |
| 6,574,751 | B1 * | 6/2003 | Lee | 714/21 |
| 6,697,900 | B1 * | 2/2004 | Hadley | 710/109 |
| 6,996,750 | B2 * | 2/2006 | Tetreault | 714/44 |
| 7,039,834 | B1 * | 5/2006 | Orfali | 714/39 |
| 7,389,381 | B1 | 6/2008 | Co | |
| 2004/0137942 | A1 * | 7/2004 | Lee et al. | 455/556.1 |
| 2004/0153849 | A1 * | 8/2004 | Tucker et al. | 714/43 |
| 2005/0021748 | A1 * | 1/2005 | Garcea et al. | 709/224 |
| 2006/0203740 | A1 * | 9/2006 | Chang | G06F 11/0745 370/252 |
| 2007/0262879 | A1 * | 11/2007 | Greiner et al. | 340/870.21 |
| 2009/0177934 | A1 | 7/2009 | Irby et al. | |
| 2010/0153787 | A1 * | 6/2010 | Beattie et al. | 714/43 |
| 2011/0107152 | A1 * | 5/2011 | Adams | 714/43 |
| 2014/0336892 | A1 * | 11/2014 | Braunberger | 701/70 |
| 2015/0006774 | A1 * | 1/2015 | Lee et al. | 710/107 |
| 2015/0106649 | A1 * | 4/2015 | Kannan | G06F 1/08 713/501 |

* cited by examiner

INTEGRATED CIRCUIT AND METHOD FOR MONITORING BUS STATUS IN INTEGRATED CIRCUIT

CROSS-REFERENCE TO RELATED APPLICATIONS

This application claims priority to Chinese Patent Application No. 201210051640.6, filed on Mar. 1, 2012, which is hereby incorporated by reference in its entirety.

FIELD OF THE INVENTION

The present invention relates to the field of electronic monitoring, and in particular, to an integrated circuit and a method for monitoring a bus status in the integrated circuit.

BACKGROUND OF THE INVENTION

In order to ensure normal operation and debugging of electronic equipment, and reduce design verification time of the electronic equipment in a developing process, real-time monitoring usually needs to be performed on a work status of an internal circuit of the electronic equipment when the electronic equipment works.

In the prior art, there are mainly two manners to perform the real-time monitoring on the work status of the internal circuit of the electronic equipment. One is to read work status information by controlling a CPU (central processing unit), and report the work status information to an observing device; and the other is to connect a signal of each circuit device to a chip pin, and analyze an internal work status by observing a pin voltage. For a work process of the first manner, reference may be made to FIG. 1. As shown in the figure, A is a circuit device with a structure similar to that of B, a bus 1 is a next-level bus of a first-level bus, and is configured to report data to the first-level bus, a bus 3 reports the data to a bus 2, where level by level reporting is adopted, and the data is sent to a processor from the first level. In a method for acquiring a work status of an internal circuit in a first existing technology, reading of work status data needs to be controlled by the CPU, and the work status data needs to be transmitted through the bus 1. For a work process of the second manner, reference may be made to FIG. 2. As shown in FIG. 2, in a method for acquiring a work status of an internal circuit in a second existing technology, a signal of a circuit device is connected to a chip pin, and a work status of the circuit device to which the pin is connected is determined by observing a voltage on the chip pin, where an interface exists between each-level bus and the chip pin.

However, for the method adopted in the first existing technology, in the case that a system needs to frequently access an internal status, the CPU and the bus 1 may be very busy, which affects system performance in the whole; and for the method adopted in the second existing technology, due to a limitation of the number of chip pins, the type of an accessed work status of the internal circuit is also greatly limited.

SUMMARY OF THE INVENTION

Accordingly, embodiments of the present invention provide an integrated circuit and a method for monitoring a bus status in the integrated circuit, so as to acquire a work status of an internal circuit, reduce a burden of a bus, and avoid a limitation caused by the number of chip pins.

To implement the foregoing objective, the present invention provides the following technical solutions:

An integrated circuit, including:
a processor, a host bus, multiple branch buses, multiple status detectors, a top layer monitor, and an interface; where
the multiple branch buses are coupled to the processor through the host bus;
the host bus is configured to transmit data from the multiple branch buses to the processor;
the processor is configured to perform data processing;
each status detector in the multiple status detectors is coupled to a branch bus in the multiple branch buses respectively, and is configured to read status data on the branch bus that is coupled to each status detector, and upload the status data to the top layer monitor; and
the top layer monitor is configured to collect the status data from each status detector, and output the status data through the interface.

A method for monitoring a bus status in an integrated circuit, where the method includes:
reading, by each status detector in multiple status detectors, status data on a branch bus that is coupled to each status detector in the multiple status detectors; and
collecting, by a top layer monitor, the status data from each status detector, and outputting the status data through an interface, where
the branch buses are coupled to a processor through a host bus;
the host bus is configured to transmit data from the branch buses to the processor; and
the processor is configured to perform data processing.

It can be learned from the foregoing technical solutions that, compared with the prior art, the embodiments of the present invention disclose an integrated circuit and a method for monitoring a bus status in the integrated circuit, where the integrated circuit includes a processor, a host bus, multiple branch buses, multiple status detectors, a top layer monitor, and an interface. The multiple branch buses are coupled to the processor through the host bus, the host bus transmits data from the multiple branch buses to the processor, each status detector in the multiple status detectors is coupled to a bus in the multiple branch buses, reads status data on the branch bus that is coupled to each status detector, and uploads the status data to the top layer monitor, and the top layer monitor collects the status data from each status detector, and outputs the status data through the interface. With the integrated circuit and the method for monitoring a bus status of the integrated circuit, an idle bottom path, that is, a branch bus, is used to read status data of the branch bus, and then collect status data read by multiple branch buses and send it to the interface, thereby reducing a burden of a host bus and avoiding a limitation caused by the number of chip pins.

BRIEF DESCRIPTION OF THE DRAWINGS

To illustrate the technical solutions in the embodiments of the present invention or in the prior art more clearly, the accompanying drawings required for describing the embodiments or the prior art are briefly introduced in the following. Apparently, the accompanying drawings in the following description merely show some embodiments of the present invention, and persons of ordinary skill in the art may still derive other drawings from these accompanying drawings without creative efforts.

DETAILED DESCRIPTION OF THE EMBODIMENTS

The technical solutions in the embodiments of the present invention are clearly and completely described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
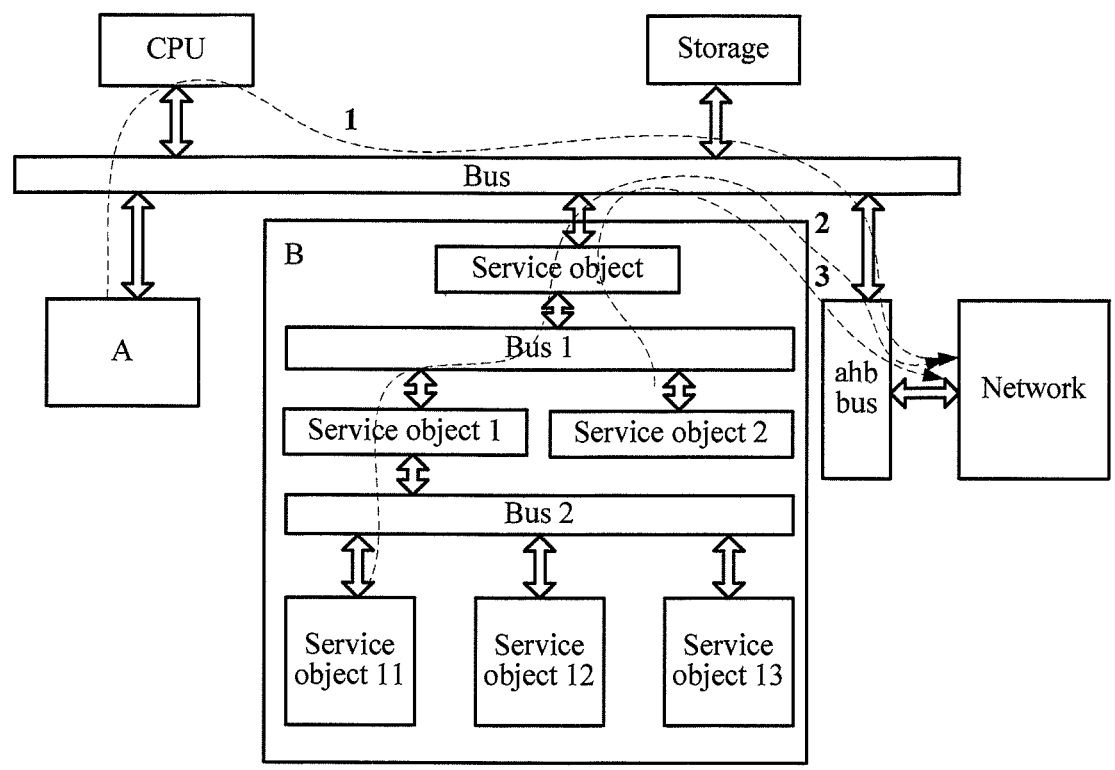
FIG. 1 is a schematic diagram of a method for acquiring a work status of an internal circuit of electronic equipment according to a first existing technology.
Figure 2:
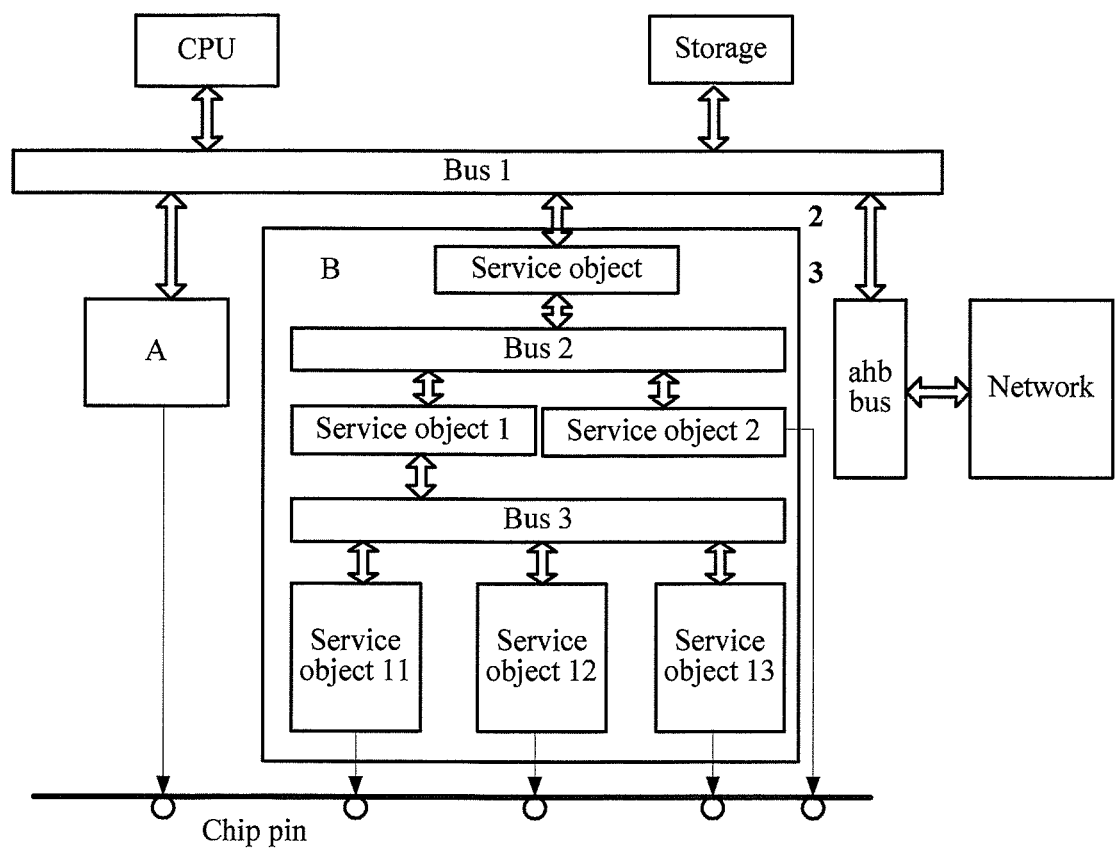
FIG. 2 is a schematic diagram of a method for acquiring a work status of an internal circuit of electronic equipment according to a second existing technology.
Figure 3:
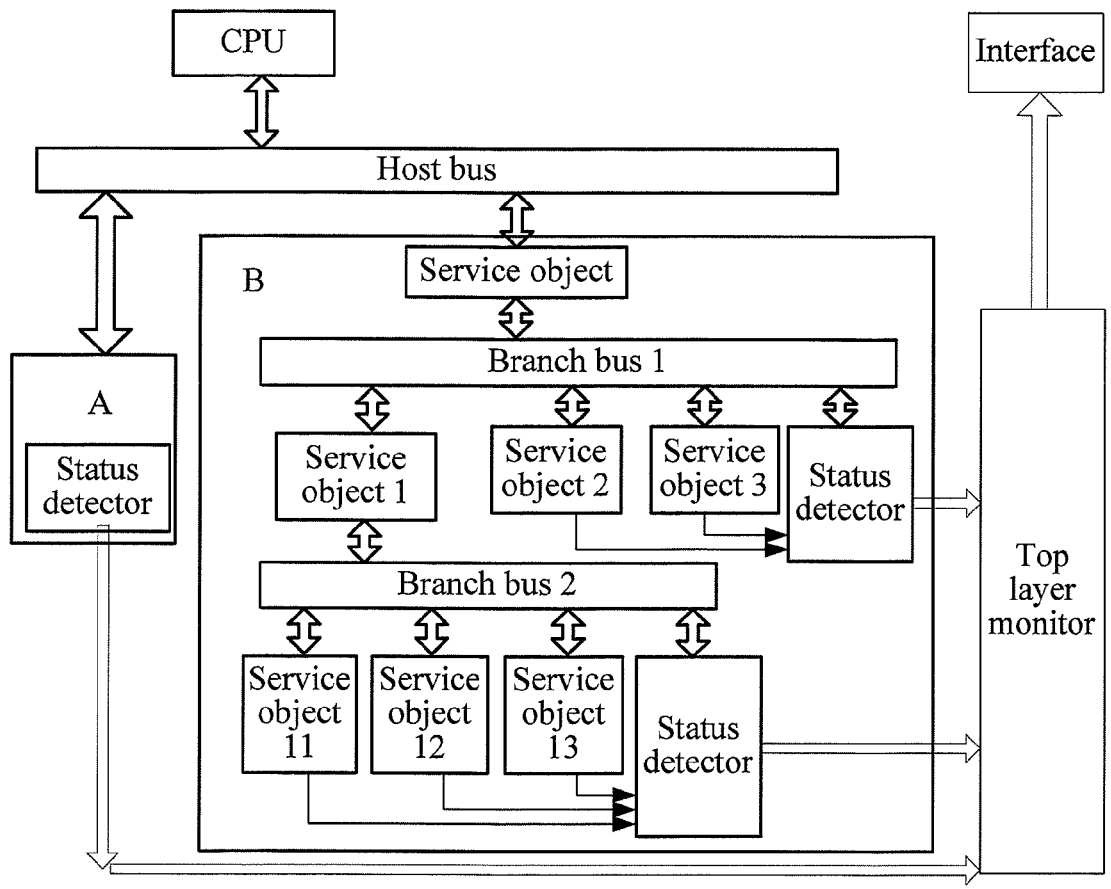
FIG. 3 is a schematic diagram of a layout of an integrated circuit disclosed in an embodiment of the present invention.

FIG. 3 is a schematic diagram of a layout of an integrated circuit disclosed in an embodiment of the present invention. Referring to FIG. 3, A is a circuit device with a structure similar to that of B. Each status detector is deployed on a branch bus, and is in the same level as a functional unit of the branch bus where the status detector is located, where a parallel relationship exists between the functional unit and the status detector.

The integrated circuit may include: a processor, a host bus, multiple branch buses, multiple status detectors, a top layer monitor, and an interface; where the multiple branch buses are coupled to the processor through the host bus;

the host bus is configured to transmit data from the multiple branch buses to the processor;

a branch bus in the multiple branch buses is coupled to the host bus through another branch bus; and the processor is configured to perform data processing; and the data may be transmitted to the processor by each-level bus inside the integrated circuit, and then the processor processes the data, where the data may include, but is not limited to, service data such as audio and video.

Figure 4:
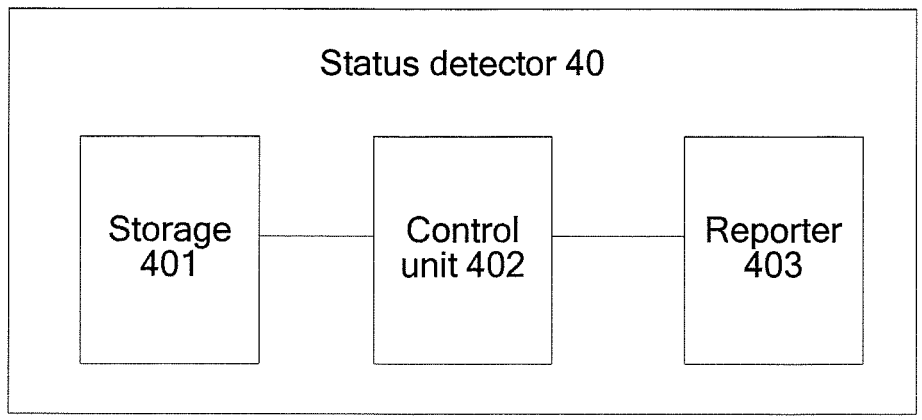
FIG. 4 is a schematic structural diagram of a status detector disclosed in an embodiment of the present invention.

Each status detector in the multiple status detectors is coupled to a bus in the multiple branch buses, and is configured to read status data on the branch bus that is coupled to each status detector, and upload the status data to the top layer monitor. For an exemplary structure of each status detector, reference may be made to FIG. 4. As shown in the figure, each status detector 40 may include:

a storage 401, configured to store a status access request on the branch bus that is coupled to each status detector in the integrated circuit, where the status access request may be periodically generated by the status detector, and may also be generated by a functional unit that is coupled to each status detector through the branch bus in the integrated circuit;

a control unit 402, configured to read the status access request that is from the storage, and trigger an operation of reading status data on the branch bus that is coupled to each status detector, where each status detector may periodically read the status data on the branch bus that is coupled to each status detector; and a reporter 403, configured to upload the read status data to the top layer monitor.

The top layer monitor is configured to collect the status data from each status detector, and output the status data through the interface. The status data collected by each status detector reflects a status condition of a bus detected by the status detector, for example, a busy degree of the bus. In an actual application, if data volume which a bus bears exceeds a certain threshold or reaches a certain ratio of a maximum load, for example, 80%, it can be considered that the bus is busy.

Figure 5:
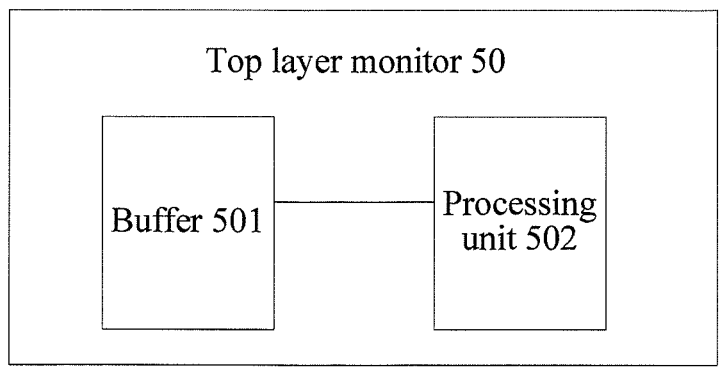
FIG. 5 is a schematic structural diagram of a top layer monitor disclosed in an embodiment of the present invention.

In an exemplary example, for a schematic structural diagram of a top layer monitor, reference may be made to FIG. 5. As shown in FIG. 5, the top layer monitor 50 may include:

a buffer 501, configured to buffer the status data from each status detector, where each status detector may simultaneously send the status data to the top layer monitor, and a time conflict may occur, and therefore, a buffer is disposed in the top layer monitor, and an operation conflict of time can be smoothed, and the buffer 501 includes at least one buffer block; and a processing unit 502, configured to separately pack the status data from each status detector to obtain packed status data from each status detector, and output the packed status data from each status detector through the interface, where the packed status data from each status detector includes an identifier that corresponds to each status detector, or configured to group the status data from multiple status detectors into different types of status data, pack the same type of status data, and output the same type of packed status data through the interface.

If the status data is packed according to a source address of the status data, an identifier corresponding to each status detector is set in the packed status data from each status detector, so that which branch bus is the packed status data from can be determined conveniently and fast, and the status data of the branch bus which is expected to be known may be targetedly and directly known. If the status data is grouped according to different types, there may be different grouping standards, for example, receiving time of the status data, and a memory attribute of the status data. Definitely, according to a different requirement of a user, there may be another attribute characteristic which is capable of distinguishing the status data.

In this embodiment, the integrated circuit includes a processor, a host bus, multiple branch buses, multiple status detectors, a top layer monitor, and an interface. The multiple branch buses are coupled to the processor through the host bus, the host bus is configured to transmit data from the multiple branch buses to the processor, each status detector in the multiple status detectors is coupled to a bus in the multiple branch buses, and is configured to read status data on the branch bus that is coupled to each status detector and upload the status data to the top layer monitor, and the top layer monitor collects the status data from each status detector and outputs the status data through the interface. With the integrated circuit and the method for monitoring a bus status of the integrated circuit, an idle bottom path, that is, a branch bus, is used to read status data of the branch bus, and then collect status data read by multiple branch buses and send it to the interface, thereby reducing a burden of a host bus and avoiding a limitation caused by the number of chip pins.

Embodiment 2

Figure 6:
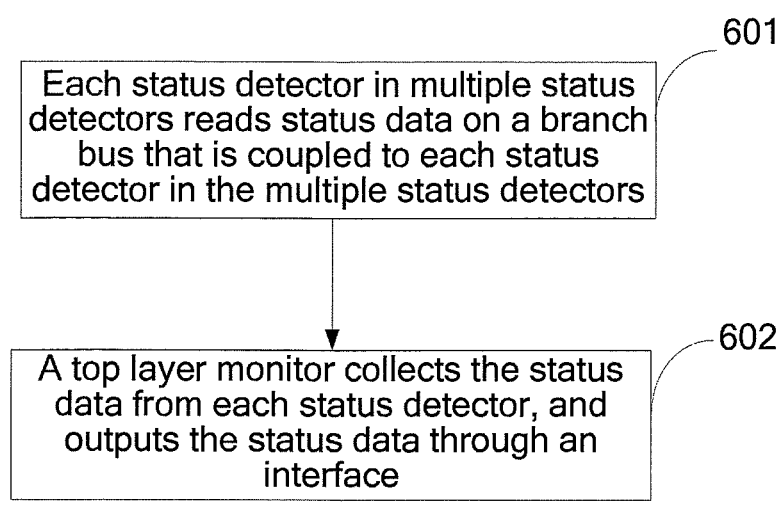
FIG. 6 is a flow chart of a first method for monitoring a bus status of an integrated circuit disclosed in an embodiment of the present invention.

FIG. 6 is a flow chart of a first method for monitoring a bus status of an integrated circuit disclosed in an embodiment of the present invention. Referring to FIG. 6, the method may include:

Step 601: Each status detector in multiple status detectors reads status data on a branch bus that is coupled to each status detector in the multiple status detectors.

The integrated circuit further includes a host bus and a processor, where the branch buses are coupled to the processor through the host bus, the host bus is configured to transmit data from the branch buses to the processor, and the processor is configured to perform data processing.

Step 602: A top layer monitor collects the status data from each status detector, and outputs the status data through an interface.

Figure 7:
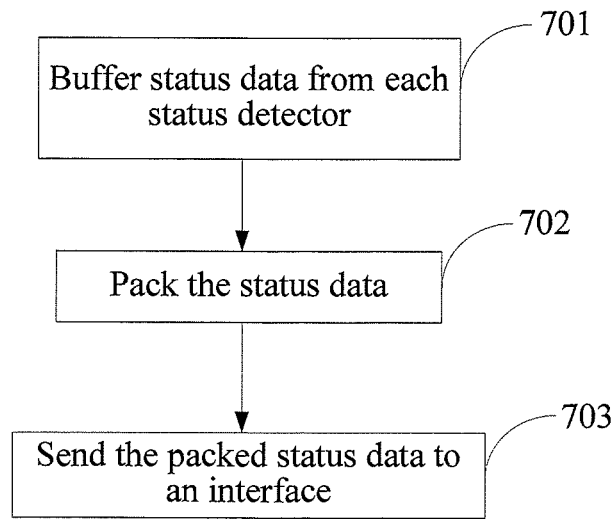
FIG. 7 is a work flowchart of a top layer monitor disclosed in an embodiment of the present invention.

In an exemplary example, for implementation of step 602, reference may be made to FIG. 7. FIG. 7 is a work flow chart of a top layer monitor disclosed in an embodiment of the present invention, and as shown in the figure, the top layer monitor may include:

Step 701: Buffer status data from each status detector.

To avoid path congestion caused by that multiple status detectors send status data to the top layer monitor, the status data is buffered to smooth a time conflict.

Step 702: Pack the status data.

The status data from each status detector may be packed separately; or the status data from the multiple status detectors may be grouped into different types of status data, and the same type of status data is packed.

Step 703: Send the packed status data to an interface.

In this embodiment, with the method for controlling a bus in the integrated circuit, multiple status detectors and a top layer monitor are disposed in the integrated circuit. Each status detector in the multiple status detectors is used to read status data on a branch bus that is coupled to each status detector in the multiple status detectors, and then the top layer monitor collects the status data from each status detector, and outputs the status data through an interface. An idle bottom path, that is, a branch bus, is used to read status data of the branch bus, and then collect status data read by the multiple branch buses and send it to the interface, thereby reducing a burden of a host bus and avoiding a limitation caused by the number of chip pins.

Embodiment 3

Figure 8:
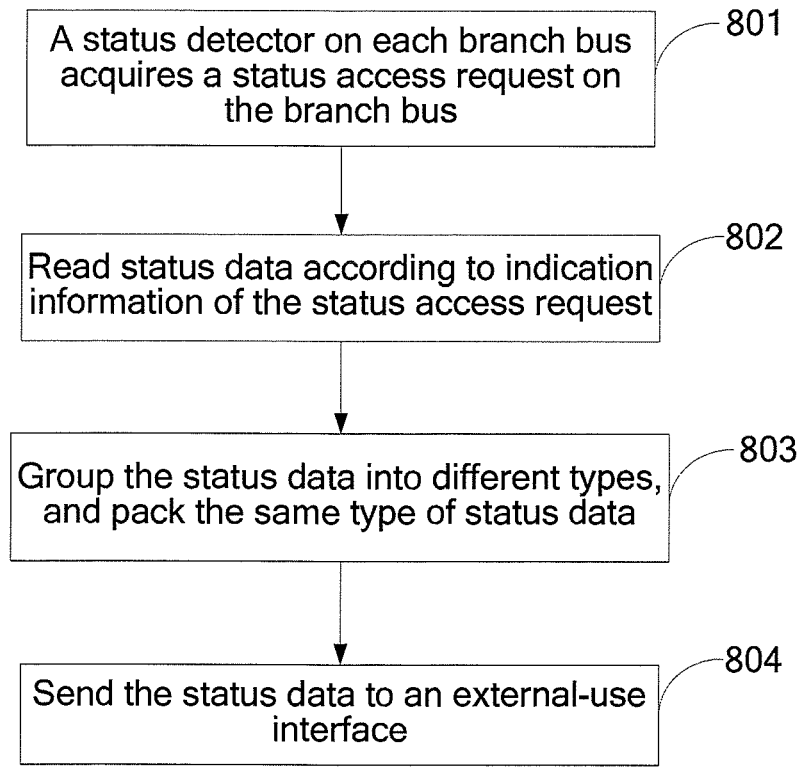
FIG. 8 is a flow chart of a second method for monitoring a bus status of an integrated circuit disclosed in an embodiment of the present invention.

FIG. 8 is a flow chart of a second method for monitoring a bus status of an integrated circuit disclosed in an embodiment of the present invention. Referring to FIG. 8, the method for monitoring a status may include:

Step 801: A status detector on each branch bus acquires a status access request on the branch bus.

In this step, the status access request has two sources. One is a timing access request that is periodically generated by the status detector according to preset configuration, where the preset configuration specifies, for each internal module, how often a status access request is initiated. The other source of the status access request is a requesting access request sent by each functional module. A requesting access request sent by a functional module is usually generated according to a characteristic of the functional module due to triggering of some special statuses. The triggering of special statuses, may include, but is not limited to, that a certain module completes a preset task in advance, and to avoid being centralized with a timing status access request and increasing processing difficulty, and actively requests, in advance, a status detector to access a status of the module; and may also be a requesting access request generated due to triggering of initiation of a user to access a work status of a certain functional module at this time.

Step 802: Read status data according to indication information of the status access request.

The indication information includes an address of a status that needs to be accessed and the number of bytes of an access status that needs to be read.

Figure 9:
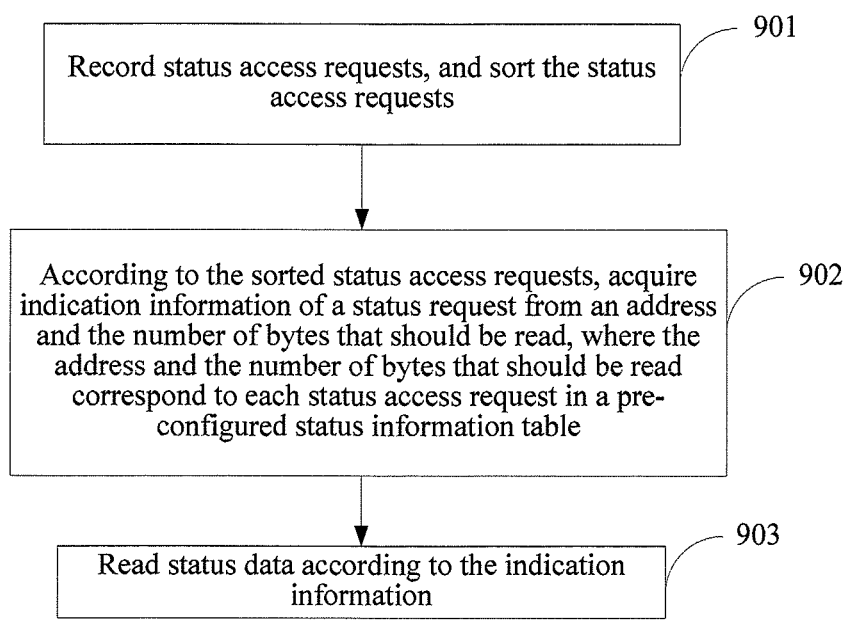
FIG. 9 is a schematic diagram of a procedure of reading status data disclosed in an embodiment of the present invention.

In an exemplary example, for implementation of step 802, reference may be made to FIG. 9. FIG. 9 is a schematic diagram of a procedure of reading status data disclosed in an embodiment of the present invention, and as shown in FIG. 9, the procedure may include:

Step 901: Record status access requests, and sort the status access requests.

Acquired status access requests are recorded, and the acquired status access requests may be sorted as required by a user according to a different standard, for example: sorting may be performed in descending order according to a priority level of each status access request; and sorting may also be performed chronologically according to acquisition time of each status access request.

Step 902: According to the sorted status access requests, acquire indication information of a status request from an address and the number of bytes that should be read, where the address and the number of bytes that should be read correspond to each status access request in a pre-configured status information table.

According to a sequence sorted in step 901, an address in which a status that needs to be accessed is located and the number of bytes of a status that needs to be read are obtained from a pre-configured status information table in order, and serve as indication information to make preparation for reading status data.

Step 903: Read status data according to the indication information.

Definitely, the sorting in FIG. 9 is not necessary, and in an actual application, each status access request may be recorded randomly.

The status data is read through a bus according to the address of the status that needs to be read and the number of bytes that need to be read, where the address of the status that needs to be read and the number of bytes that need to be read are determined in step 902.

Step 803: Group the status data into different types, and pack the same type of status data.

In this step, status data from different status detectors may be grouped into different types according to a source address of the status data, and the status data is packed according to different types. Definitely, a type grouping manner may not be limited to this. Because each status detector may simultaneously send the status data, an external-use interface may be congested. Through buffering and packing processing, a sending time conflict of the status data may be smoothed to a certain extent.

Step 804: Send the status data to an external-use interface.

In this embodiment, with the method for controlling a bus in the integrated circuit, multiple status detectors and a top layer monitor are disposed in the integrated circuit. Each status detector in the multiple status detectors is used to read status data on a branch bus that is coupled to each status detector in the multiple status detectors, and then the top layer monitor collects the status data from each status detector, and outputs the status data through an interface. An idle bottom path, that is, a branch bus, is used to read status data of the branch bus, and then collect status data read by multiple branch buses and send it to the interface, thereby reducing a burden of a host bus and avoiding a limitation caused by the number of chip pins.

It should further be noted that, in this specification, relationship terms such as first and second are merely used to distinguish an entity or operation from another entity or operation, but do not require or imply any actual relationship or sequence between these entities or operations. Moreover, the terms "include", "comprise", and any of their variations are intended to cover a non-exclusive inclusion". Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . ." does not exclude other same elements existing in the process, method, object, or device which includes the element.

The methods or steps described in this specification may be implemented by using hardware directly or by using a software module executed by a processor, or by using a combination of the two. The software module may be located in a random access memory (RAM), a memory, a read only memory (ROM), an electrically programmable ROM an electrically erasable programmable ROM, a register, a hard disk, a removable disk, a CD-ROM, or any other storage medium well-known in the art.

The foregoing descriptions of the disclosed embodiments allow persons skilled in the art to implement or use the present invention. Multiple modifications to these embodiments are apparent for persons skilled in the art. A general principle defined in the present invention may be implemented in other embodiments without departing from the spirit or scope of the present invention. Therefore, the present invention will not be limited to the embodiments described in this specification but extends to a widest scope that complies with the principle and novelty disclosed in this specification.

What is claimed is:

1. An integrated circuit, comprising:
a processor, a host bus, multiple branch buses, multiple status detectors, a top layer monitor, and an interface; wherein
the multiple branch buses are coupled to the processor through the host bus;
the host bus is configured to transmit data from the multiple branch buses to the processor;
the processor is configured to perform data processing;
each status detector in the multiple status detectors is coupled to a respective, corresponding branch bus in the multiple branch buses, and is configured to read status data on the corresponding branch bus that is coupled to the status detector, and upload the status data to the top layer monitor; and
the top layer monitor is configured to collect the status data from each status detector, and output the status data through the interface, wherein the status data collected by each status detector reflects a status condition of the corresponding branch bus, the status condition corresponding to a volume of data that the corresponding branch bus bears.

2. The integrated circuit according to claim 1, wherein the top layer monitor comprises at least one buffer, configured to buffer the status data from each status detector.

3. The integrated circuit according to claim 2, wherein the top layer monitor comprises: a processing unit, configured to separately pack the status data from each status detector to obtain packed status data from each status detector, and output the packed status data from each status detector through the interface, wherein the packed status data from each status detector comprises an identifier that corresponds to each status detector, or
configured to group the status data from the multiple status detectors into different types of status data, pack the same type of status data, and output the same type of packed status data through the interface.

4. The integrated circuit according to claim 1, wherein each status detector is configured to pack the status data, and upload packed status data to the top layer monitor.

5. The integrated circuit according to claim 1, wherein each status detector comprises:
a storage, configured to store a status access request on the corresponding branch bus that is coupled to the status detector in the integrated circuit;
a control unit, configured to read the status access request that is from the storage, and trigger an operation of reading the status data on the corresponding branch bus that is coupled to the status detector; and
a reporter, configured to upload the read status data to the top layer monitor.

6. The integrated circuit according to claim 1, wherein each status detector periodically reads the status data on the corresponding branch bus that is coupled to the status detector.

7. The integrated circuit according to claim 6, wherein the corresponding branch bus is coupled to the host bus through another branch bus.

8. A method for monitoring a bus status in an integrated circuit, comprising:
reading, by each status detector in multiple status detectors, status data on a respective, corresponding branch bus in multiple branch buses that is coupled to the status detector; and
collecting, by a top layer monitor, the status data from each status detector, and outputting the status data through an interface, wherein the status data collected from each status detector reflects a status condition of the corresponding branch bus, the status condition corresponding to a volume of data that the corresponding branch bus bears, wherein
the branch buses are coupled to a processor through a host bus;
the host bus is configured to transmit data from the branch buses to the processor; and
the processor is configured to perform data processing.

9. The method according to claim 8, wherein collecting, by the top layer monitor, the status data from each status detector comprises: buffering the status data from each status detector.

10. The method according to claim 9, wherein outputting the status data through the interface comprises:
separately packing the status data from each status detector; or grouping the status data from the multiple status detectors into different types of status data, and packing the same type of status data; and sending packed status data to the interface.

11. The integrated circuit according to claim 1, wherein, in response to the volume of data that the corresponding bus bears exceeding a threshold, the status data reflects a busy status condition of the corresponding bus.

12. The integrated circuit according to claim 1, wherein, in response to the volume of data that the corresponding bus bears reaching a load ratio, the status data reflects a busy status condition of the corresponding bus.

13. The method according to claim 8, wherein, in response to the volume of data that the corresponding bus bears exceeding a threshold, the status data reflects a busy status condition of the corresponding bus.

14. The method according to claim 8, wherein, in response to the volume of data that the corresponding bus bears reaching a load ratio, the status data reflects a busy status condition of the corresponding bus.

\* \* \* \* \*